March 1, 1966 — M. F. PETERS — 3,237,715
FLEXIBLE HOSE STRUCTURES
Original Filed Sept. 15, 1959
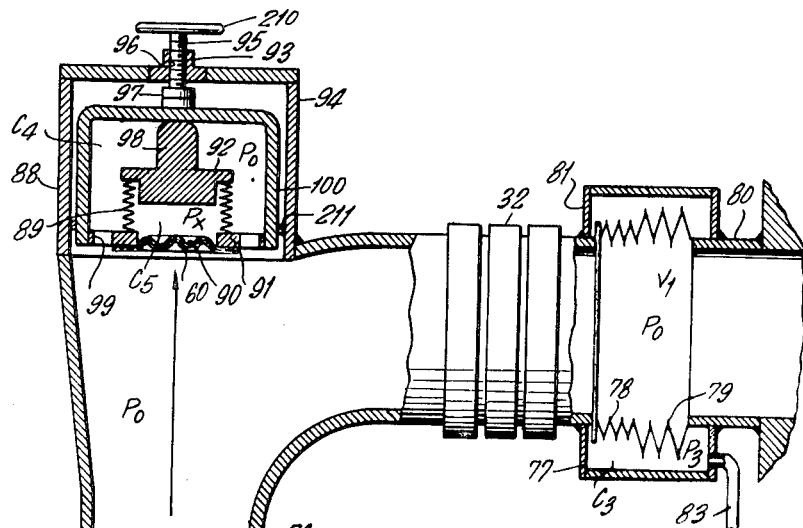
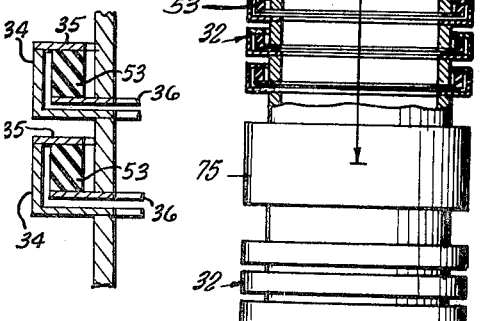
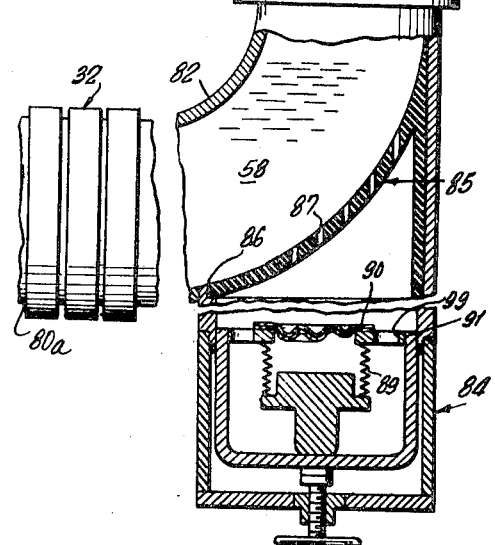
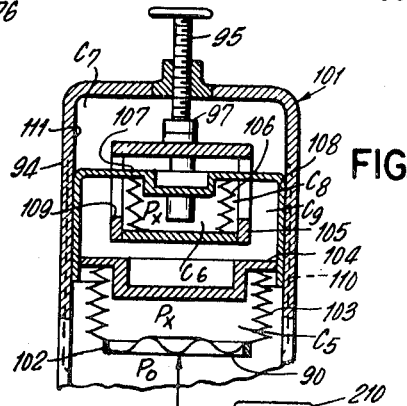
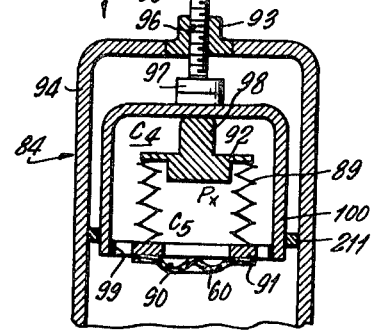
FIG. 1
FIG. 1a
FIG. 2
FIG. 3
INVENTOR.
MELVILLE F. PETERS
BY Albert F. Kronman
ATTORNEY

United States Patent Office 3,237,715
Patented Mar. 1, 1966

3,237,715
FLEXIBLE HOSE STRUCTURES
Melville F. Peters, Livingston, N.J., assignor of fifty percent to Joseph J. Mascuch, Millburn, N.J.
Original application Sept. 15, 1959, Ser. No. 840,173. Divided and this application Oct. 3, 1963, Ser. No. 313,610
4 Claims. (Cl. 181—47)

This application is a division of an application for patent entitled Flexible Hose Structures, filed September 15, 1959, Serial No. 840,173, and now abandoned.

This invention relates to flexible conduits or hoses, and particularly large diameter conduits capable of withstanding extremely high pressures without loss of flexibility.

Presently known flexible metal hose consists of a fluid tight flexible element covered with braid. The fluid tight member is usually formed with a convoluted wall to impart flexibility. The convoluted wall can be formed hydraulically from metal tubing or by winding metal strips upon a suitable mandrel and soldering or welding the seams together. The fluid tight element in the convoluted form has negligible resistance to elongation and consequently the element must be reinforced with braid if it is used to confine fluids under pressure. The braid which is in tension when pressurized is subjected to both the internal and external forces acting on the ends of the hose. Neglecting the external forces which are usually trivial compared to the internal forces acting on high pressure hose, the axial force operating on the braid is equal to the cross-sectional area of the hose multiplied by the fluid pressure differential, which is the difference between the pressure acting on the inner and outer surfaces of the flexible element. For example, a hose two inches in diameter operating at a pressure differential of 1000 p.s.i. will have an axial tension of 3142 pounds, or over 1½ tons. Since, in known devices the axial tension must be borne by the braid, a sufficient number of strands of wire or thread in the braid assembly must be used to support this load. As either the diameter of the hose or the operating pressure differentials are increased, it is necessary to increase the strength of the braid assembly. Braid strength can be increased to a limited extent by increasing the diameter of the strands of wires or threads, after which further strengthening of the braid assembly must be done by increasing the number of layers of braid. Each time the strength of the braid assembly is increased by either increasing the diameter of the strands or the number of layers of braid, there will be a decrease in the flexibility of the hose until the amount of material in the braid assembly becomes so great that a braid which can support the axial tension on a hose 2½ inches in diameter operating at a pressure differential of 1000 p.s.i., will be so great that the hose will have lost most of its flexibility.

It has been found possible to provide a large diameter hose and operate the hose at a high pressure differential by constructing the fluid tight flexible element so that it does not require a supporting braid.

Accordingly, it is an object of the present invention to provide a large diameter flexible hose capable of withstanding extremely high pressures without losing its flexibility.

A further object of the present invention is to eliminate sound traversing the flexible hose assembly.

An object of the present invention is to combine rigid sections with metal bellows to form hose of great flexibility and strength.

Another object of the present invention is to provide, by the use of resilient and rigid elements, a sound absorbing or attenuating structure.

A further object of the present invention is to provide a means of tuning the structure having one or more lengths of flexible hose elements so that the structure can attenuate a wide range of sound frequencies.

A feature of the present invention is its use of a series of resilient or flexible members interconnecting a series of rigid members to form a flexible hose structure.

Another feature of the present invention is its use of flexible elements in conjunction with elbows to provide mobility of the flexible hose in all directions.

A feature of the present invention is to place elastomers within the flexible hose assembly to improve the operating characteristics of the hose assembly.

Still another feature of the present invention is a combination of flexible and rigid members within the wall of the hose whereby sound traversing the conduit will become absorbed or attenuated.

Another feature of the present invention is its wall structure whereby it is possible to control the distances the sound wave must travel as it travels through the hose.

Other objects and features of the present invention will become apparent from the description of the drawings hereinafter set forth.

The invention consists of the construction, combination and arrangement of parts, as herein illustrated, described and claimed.

In the accompanying drawing, forming a part hereof are illustrated two embodiments of the invention and in which:

FIGURE 1 is a view in side elevation partially cut away of a pump and flexible hose assembly made in accordance with the present invention.

FIGURE 1A is a fragmentary view in vertical section greatly enlarged of the flexible hose shown in FIGURE 1.

FIGURE 2 is a longitudinal section taken through a modification of a flexible assembly which serves as a surge chamber and sound attenuating element for use in conjunction with the flexible hose assembly.

FIGURE 3 is a view in vertical section of the surge chamber and tuning element shown in FIGURE 1 on a somewhat enlarged scale.

Referring to the drawing and particularly to FIGURE 1, there is shown a complete assembly including a pump 75 and various flexible and sound absorbing elements associated therewith. The pump 75 has at its inlet and outlet side segmented flexible assemblies 32 made up of a series of rigid segments 34 of stepped construction having a large diameter portion 35 and a smaller diameter portion 36 interconnected by a resilient or flexible ring shaped elastomer member 53 bonded therebetween. An elbow 76 is secured to the end of the flexible assembly 32 on the outlet side of the pump 75. The opposite end of the elbow 76 is connected to still another flexible assembly 32 which in turn leads into a housing 77, through wall 81. A pair of in line bellows 78, 79, are carried within the housing 77 and connected at one end the outlet end of the flexible element 32 adjacent the housing 77 and at their other end to the rigid conduit 80. The housing 77 is also connected between the flexible element 32 and the conduit 80, by welding the walls 81 of the housing directly thereto. The in line bellows 78, 79, behave as a plurality of spaced disks and the plates can be shaped to serve as a plurality of Helmholtz resonators. A small conduit 83 is led into the chamber $C_3$ within the housing 77 and permits fluid under pressure to be introduced into contact with the outside of the bellows assembly 78, 79. Since the bellows 78, 79, consist of an assembly wherein a smaller bellows 78 is connected in line with a large bellows 79, a change in the pressure $P_3$, within the housing 77, will change the volume enclosed by the said bellows. In this manner, the unit may be tuned to resonate to a particular frequency or frequencies by adjusting the pressure $P_3$. Since a change in the pressure differential $(P_0-P_3)$ will change the volume $V_1$ enveloped by the bellows 78, 79, a sudden increase in the pressure $P_0$ will cause the volume $V_1$ to increase and thus the bellows assembly 78, 79 can be used as a surge chamber.

An elbow 82 is connected to the flexible assembly 32 on the inlet side thereof. Another flexible assembly 32 is secured to the opposite end of the elbow 82 and is in turn attached to a conduit 80a, which may be attached directly to an inlet opening (not shown). A combined surge chamber and tuning unit 84 is connected to the elbow 82 and in communication with the fluid therein. The surge chamber and tuning unit 84 is provided with an elastomer insert 85 which preferably is made of material having the same characteristic impedance as the liquid flowing through the line. The elastomer insert 85 forms a smooth surface and reduces the eddys which would be initiated at the edges 86 where the surge chamber and tuning unit 84 joins the elbow 82. A plurality of holes 87 in the insert 85 equalize the pressure on both sides of the said insert. A second surge chamber and tuning unit 88 is laterally connected to the elbow 76 and is in communication with the fluid within said elbow.

The surge chambers 84 and 88 are constructed so that they can be tuned to resonate with the fluid surges initiated by pump 75. The principle involved in this construction is similar to the principle following in tuning an unfilled portion of a bottle by raising and lowering the liquid level until the air in the cavity of the bottle can resonate with a vibrating tuning fork held at the mouth of the bottle. In chambers 84, 88, tuning for a particular wave length is done by changing the volume of the cavity and the volume required for resonance at a particular frequency will depend upon the type and temperature of fluid 58 within the line. Proper tuning requires that after the chamber has been tuned for a particular wave length, the diaphragm 90 in chamber 88, will be held a fixed distance L from pump 75, so that the flexible element 89 is forced to reduce the volume of chamber $C_4$ with an increase in pressure $P_0$ by moving its capped end 92 toward pump 75. The diaphragm 90 should be provided with a covering 60 to absorb sound waves which travel in fluid 58, regardless of whether the fluid is moving or at rest.

The surge chambers 84, 88, shown in FIGURES 1 and 3, have a nesting type bellows 89 therein. The end of the bellows 89 facing the source of the sound waves (the pump in FIGURE 1) is attached to ring 91 which is capped by diaphragm 90 to form a fluid tight seal of one end of the bellows 89. The ring 91 has holes 99 to allow fluid 58 to flow freely from elbow 76 to chamber $C_4$. The outer face of ring 91 is welded to the open end of the thimble 100. The opposite end of the bellows is welded to cap 92 to form a sealed chamber $C_5$. The rounded stop 98 on cap 92 limits the travel of the bellows and cap assembly 89, 92, when the pressure $P_x$ within the chamber $C_5$ exceeds the pressure $P_0$, in the line. An outer housing 94 surrounds the bellows 89, the diaphragm 90, the thimble 100 and the cap 92. The housing 94 has a shoulder 93 which has a female thread 96 which receives the threaded rod 95. The rod 95 has a handle 210 on one end and a bearing 97 on the other end. The setting of the diaphragm 90 at a distance L from pump 75, is done by turning the handle 210, so that rod 95 which is free to turn in bearing 97, will move thimble 100 which is attached to diaphragm 90 by means of ring 91 with respect to the housing 94. The pressure $P_x$ in chamber $C_5$ is adjusted so that bellows 89 will not nest when the fluid pressure $P_0$ reaches its maximum value. A slidable sealing ring 211 is carried between the thimble 100 and the outer housing 94.

In FIGURE 2 there is shown a surge chamber and tuning unit 101 which maintains the diaphragm 90 at a fixed distance L from the pump without securing the diaphragm to a rigid part of the structure. This is done by using two similar expansion assemblies arranged so that the movement of the diaphragm 90 in one direction by the compression of bellows and thimble assembly 103, 108, is compensated for by an equal movement of the second assembly consisting of the cylindrical member 105 and the bellows 106, in the opposite direction. The flexible bellows and thimble assembly 103, 108, is closed by the diaphragm 90, and the bellows 103 is welded at one one of its ends to a ring 102, and at its opposite end to a cap 104 which is secured to thimble 108. A sealed chamber $C_6$ is enclosed within a cylindrical member 105, a bellow 106, attached at one end to the wall of the cylindrical member 105, and at its opposite end to a cap-like member 107. The cap 107 is part of a thimble member 108 which extends through lateral openings 109 in the cylindrical member 105, and is connected to the first cap member 104.

An adjusting rod 95 threadably carried by the outer housing 94 acts through bearing 97 to position the cylindrical member 105. The position of the thimble 108 is determined by the position of the cylindrical member 105 and the amount of extension of bellows 106, since the only connection between cap 107 and the cylindrical member 105 is through bellows 106. The walls 111 of the housing 94 of the surge chamber 101 are provided with elongated channels indicated by dashed lines 110, so that fluid 58 under pressure within the fluid bearing line can enter the chamber $C_7$ in the top of the outer housing 94 and also into chambers $C_8$, $C_9$ through the openings 109 of the cylindrical member 105. The two bellows 103 and 106 have the same spring rate and experience the same change in volume when subjected to the same pressure differential when the chambers $C_5$ and $C_6$ are pressurized to the same pressure in the extended length.

The position of diaphragm 90 with respect to the pump 75 can be adjusted at any pressure $P_0$, and its distance L from the pump will not change with a change in the operating pressure. This follows since an increase in the pressure $P_0$ will cause both bellows 103 and 106 to be compressed by an equal amount. This compression of bellows 103 raises diaphragm 90 by the same amount that the compression of bellows 106 pushes thimble 108 and the attached cap 104 down, so that the two movements cancel each other and diaphragm 90 remains at the fixed distance L from pump 75. When the pressure decreases, both bellows 103 and 106 will expand, and it follows that the diaphragm 90 will remain at the fixed distance L.

Having thus fully described the invention, what is claimed as new and desired to be secured by Letters Patent of the United States, is:

1. A combined tunable sound attenuating and surge chamber comprising an outer housing, a thimble member slidably carried within the outer housing, means to move the thimble with respect to the housing, a ring carried on one end of the thimble, a diaphragm secured to the ring to overlie the end of the thimble, a bellows within the thimble secured at one end to the ring, a cap overlying the opposite end of the bellows and openings in the ring to admit fluid into the thimble.

2. A combined tunable sound attenuating and surge chamber comprising an outer housing, a thimble member slidably carried within the outer housing, means to move the thimble with respect to the housing, a first cap member attached to the thimble, a first bellows secured at one end to the first cap, a ring secured to the free end of the first bellows, a cylindrical member within the thimble, openings in the cylindrical member to receive a portion of the thimble therethrough, a second bellows secured at its upper end to the thimble and at its lower end to the cylindrical member and means to admit fluid under pressure into the outer housing and further means to admit fluid under pressure into contact with the outside of the second bellows assembly, a diaphragm secured to the ring to seal off the other end of the first bellows, and a cap overlying the free end of the second bellows.

3. A device according to claim 1 in which the diaphragm is covered by a sound absorbing material.

4. A fluid line sound absorbing assembly comprising a conduit, a plurality of flexible elements in said conduit comprising rigid large and small diameter ring-like portions interconnected by resilient elastomer members, at least one elbow in the conduit, a wall adjacent the elbow comprising an elastomer insert having a plurality of small holes therein, at least one tunable sound attenuating surge chamber carried by and in communication with the interior of the conduit elbow comprising a housing, a thimble member slidably carried within the housing and means to move the thimble with respect to the housing to tune the chamber to resonate to a desired frequency.

References Cited by the Examiner
UNITED STATES PATENTS

| | | | |
|---|---|---|---|
| 1,001,842 | 8/1911 | Greenfield | 138—120 |
| 2,136,770 | 11/1938 | Witzenmann | 138—120 X |
| 2,682,312 | 6/1954 | Hopkins. | |
| 2,829,669 | 4/1958 | Luzynski | 138—30 X |
| 2,847,035 | 8/1958 | Peters | 138—30 |

LAVERNE D. GEIGER, *Primary Examiner.*

LEWIS J. LENNY, EDWARD V. BENHAM,
*Examiners.*